UNITED STATES PATENT OFFICE.

CARL LUDWIG MÜLLER, OF LUDWIGSHAFEN-ON-THE RHINE, ASSIGNOR TO THE BADISCHE ANILIN AND SODA FABRIK, OF MANNHEIM, GERMANY.

RED TO BROWN DYE.

SPECIFICATION forming part of Letters Patent No. 430,534, dated June 17, 1890.

Application filed April 3, 1890. Serial No. 346,441. (Specimens.) Patented in Germany August 20, 1889, No. 50,852, and in England September 9, 1889, No. 14,222.

*To all whom it may concern:*

Be it known that I, CARL LUDWIG MÜLLER, a subject of the King of Bavaria, residing at Ludwigshafen-on-the-Rhine, in the kingdom of Bavaria and Empire of Germany, have invented new and useful Improvements in the Manufacture of a new Substantive Red to Brown Dye-Stuff, (for which Letters Patent were obtained in Germany, No. 50,852, dated August 20, 1889, and in Great Britain, No. 14,222, dated September 9, 1889,) of which the following is a specification.

This invention relates to the production of a new dye-stuff which dyes unmordanted cotton from the boiling alkaline or soap bath a salmon color when but little dye-stuff is used; and an orange-brown color when the fiber is dyed full, and which can also be used to dye or print animal fiber. The new dye-stuff is chemically the sodium salt of a disazo compound; but according to this invention it is produced by means entirely different from those usually employed in the production of such compounds, being obtained by coupling together two molecules of paramido-benzine azo-naphthionic acid by the aid of one molecule of phosgene.

The following is an example of the manner in which my invention may be carried into practical effect. By parts throughout are meant parts by weight. About fifteen (15) parts of finely-powdered acetyl-paraphenylenediamine, (also called paramido-acetanilide, *Berichte der Deutschen Chemischen Gesellschaft* XVII, 343,) are dissolved in a mixture of about forty-five (45) parts of hydrochloric acid, (containing about thirty-two (32) per cent. real hydrochloric acid HCl,) about two hundred (200) parts of water, and about two hundred (200) parts of ice. Then about seven (7) parts of sodium nitrite dissolved in twenty-one (21) parts of water are added and the whole is kept well stirred for about an hour. The solution of the diazo-acetanilide thus obtained in the well-known manner is slowly run into a solution of about thirty-one (31) parts of crystallized sodium naphthionate and thirty-six parts (36) of calcined soda in three hundred and sixty (360) parts of water. Ninety (90) parts of ice are also added before the addition of the diazo compound to prevent undue rise of temperature. The mixture is then allowed to stand for about twelve (12) hours, by which time the azo body formed separates out completely and is filtered off and pressed.

To split off the acetyl group the product is boiled for about seven (7) hours with a solution of caustic soda, made by mixing about sixty (60) parts of caustic-soda solution containing about thirty-five to thirty-six per cent. of sodium hydroxide with one hundred and fifty (150) parts of water, and water is added from time to time to replace that lost by evaporation. On cooling, a coloring-matter, the sodium salt of paramido-benzine-azonaphthionic acid, crystallizes out and is filtered, pressed, and then, in order to convert it into my new coloring-matter, suspended in about four hundred and fifty (450) parts of water, to which six hundred (600) parts of ice are added, and a stream of phosgene gas is passed in, or liquid phosgene added, till the mixture shows an acid reaction. The new coloring-matter separates out in an insoluble form, as a free or uncombined acid, which is filtered and pressed, and without previous drying converted into the commercial or mercantile form of its sodium salt by mixing it with the requisite quantity of powdered sodium carbonate and drying the mixture. The dye-stuff thus obtained is chemically a sodium salt of an acid, the constitution of which is represented by the formula:

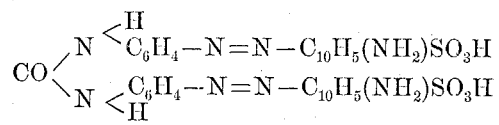

and which can therefore be also regarded as a disazo combination of one molecule of symmetrical diamido-diphenylurea with two molecules of naphthionic acid, and which dye-stuff is further characterized by the following properties: it is a brownish-red powder, soluble in water and alcohol, yielding orange-red solutions. The addition of hydrochloric acid to the aqueous solution produces a dark bluish-purple precipitate, whereas caustic soda produces no change. In concentrated sulphuric acid it is soluble, giving a purple-red solution, from which water precipitates a purple-blue precipitate. The new dye-stuff dyes unmordanted cotton from the boiling alkaline or soap bath entirely new shades, varying from flesh color to orange-brown, according to the strength of the bath.

Now what I consider new, and therefore claim, is—

As a new article of manufacture, the hereinbefore-described pink to orange-brown substantive dye-stuff, which is a sodium salt of an acid which has the chemical constitution represented by the formula:

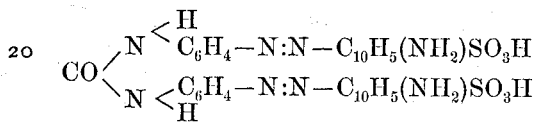

and which may be regarded as a disazo derivative of symmetrical diamido-diphenyl-urea, and which dye-stuff is further characterized by the following properties: it is a brownish-red powder soluble in water, alcohol, and sulphuric acid, the aqueous and alcoholic solutions being of an orange-red color; from the former hydrochloric acid throws down a dark bluish-purple precipitate, whereas caustic soda produces no change; the sulphuric-acid solution is purple-red in color, and water throws down from it a purple-blue precipitate; it dyes unmordanted cotton from the alkaline or soap bath new shades, varying from flesh color to orange-brown, according to the proportion of dye-stuff used, all substantially as hereinbefore described.

In testimony whereof I have hereunto set my hand in the presence of two subscribing witnesses.

CARL LUDWIG MÜLLER.

Witnesses:
HEINRICH FINMANN,
ERNEST F. EHRHARDT.